(12) United States Patent
Nagayama et al.

(10) Patent No.: US 7,381,497 B2
(45) Date of Patent: Jun. 3, 2008

(54) POSITIVE ELECTRODE ACTIVE MATERIAL FOR NON-AQUEOUS ELECTROLYTE SECONDARY BATTERY

(75) Inventors: Masatoshi Nagayama, Hirakata (JP); Hiroshi Yoshizawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 744 days.

(21) Appl. No.: 10/751,920

(22) Filed: Jan. 7, 2004

(65) Prior Publication Data

US 2004/0142240 A1      Jul. 22, 2004

(30) Foreign Application Priority Data

Jan. 16, 2003   (JP) ............................. 2003-007916

(51) Int. Cl.
*H01M 4/58*   (2006.01)

(52) U.S. Cl. ................ 429/231.3; 429/231.1; 429/231.6; 429/231.5; 429/224; 429/223; 429/231.95; 252/521.2; 252/182.1

(58) Field of Classification Search ............ 429/231.3, 429/231.1, 231.6, 231.5, 224, 223, 231.95; 252/521.2, 182.1
See application file for complete search history.

(56) References Cited

U.S. PATENT DOCUMENTS 6,805,996 B2 * 10/2004 Hosoya ................... 429/231.3

FOREIGN PATENT DOCUMENTS

| JP | 2001-319652 | 11/2001 |
| JP | 2002-203553 | 7/2002 |
| JP | 2002-289261 | 10/2002 |
| JP | 2003208895 | * 7/2003 |

OTHER PUBLICATIONS

Ohzuku Tsutomu., et al. "Solid-State Redox Reactions of $LiCoO_2$ (R3m) for 4 Volt Secondary Lithium Cells." Journal of the Electrochemical Society, vol. 141, No. 11, Nov. 1994, pp. 2972-2977.

* cited by examiner

*Primary Examiner*—Laura S Weiner
(74) *Attorney, Agent, or Firm*—McDermott Will & Emery LLP

(57) ABSTRACT

A positive electrode active material for a non-aqueous electrolyte secondary battery, comprising a lithium-containing composite oxide, wherein the composite oxide is represented by the general formula: $Li_zCo_{1-x-y}Mg_xM_yO_2$, the element M included in the general formula is at least one selected from the group consisting of Al, Ti, Sr, Mn, Ni and Ca, the values x, y and z included in the general formula satisfy: (i) $0 \leq z \leq 1.03$; (ii) $0.005 \leq x \leq 0.1$; and (iii) $0.001 \leq y \leq 0.03$, the composite oxide has a crystal structure attributed to a hexagonal system in an overcharged state having a potential over 4.25 V relative to metallic Li, and a maximum value of an oxygen generation peak in a gas chromatograph mass spectrometry measurement of the composite oxide in the overcharged state is in the range of 330 to 370° C.

4 Claims, 4 Drawing Sheets

POSITIVE ELECTRODE ACTIVE MATERIAL FOR NON-AQUEOUS ELECTROLYTE SECONDARY BATTERY

BACKGROUND OF THE INVENTION

As active materials to be used for positive electrodes of non-aqueous electrolyte secondary batteries, lithium-containing composite oxides have been widely used, and among them, a composite oxide containing cobalt has been in the mainstream. However, in a non-aqueous electrolyte secondary battery in a charged state where a battery voltage is raised from about 4.2 V (a positive electrode potential of about 4.25 V relative to metallic Li) to 4.45 V, a composite oxide containing cobalt phase-transfers from a hexagonal system to a monoclinic system. With the battery further charged, the composite oxide phase-transfers to the hexagonal system, but the monoclinic system appears again as the battery voltage reaches and surpasses about 4.6 V (cf. The Journal of Electrochemical Society, Vol. 141, 1994, P 2972 to 2977).

A monoclinic crystal structure appears due to distortion of a whole crystal. In a monoclinic composite oxide, therefore, binding power between oxygen ions which have a dominant role in maintaining a crystal structure and metallic ions which exist around the oxygen ions has decreased, and the thermal resistance of the composite oxide has significantly deteriorated. It has been known that a composite oxide may decompose when the thermal resistance thereof deteriorates, leading to generation of oxygen.

For the purpose of stably maintaining a crystal structure of a positive electrode active material even in an overcharged state, there has been proposed a technique of incorporating a specific element into a composite oxide (e.g. Japanese Laid-Open Patent Publication No. 2002-203553). It has also been reported that the similar technique allows improvement in cycle characteristic of a non-aqueous electrolyte secondary battery at a high temperature (e.g. Japanese Laid-Open Patent Publication No. 2001-319652).

On the other hand, there has also been proposed a technique of incorporating a specific element into a composite oxide containing nickel as a main constituent with the aim of stably maintaining the crystal structure thereof (e.g. Japanese Laid-Open Patent Publication No. 2002-289261).

It is however difficult to enhance stability of an active material only by controlling the composition thereof. Since a temperature for synthesis is described neither in Japanese Laid-Open Patent Publication No. 2002-203553 nor Japanese Laid-Open Patent Publication No. 2001-319652, for example, it is presumed that each of the active materials described in these publications is produced by, at least, baking a raw material mixture at below 1000° C., as conventionally done. This is because synthesis of an active material at a temperature of 1000° C. or higher usually causes occurrence of oxygen deficiency, or the like, in the production process, which undesirably lowers the stability of the active material. It is however considered that so long as the occurrence of oxygen deficiency or the like is prevented, the higher a baking temperature for raw materials for an active material, the higher structural stability of an active material can be obtained.

It is further mentioned in Japanese Laid-Open Patent Publication No. 2002-289261 that the disclosed composite oxide containing nickel as a main constituent has a pyrolysis peak in the range of 270 to 350° C. in a DSC measurement. However, the improvement in thermal stability of the active material described in Japanese Laid-Open Patent Publication No. 2002-289261 has limits and fails to reach a satisfactory level since the raw material mixture was baked at a temperature of 900° C. or lower in the production process of the active material. Furthermore, it is more difficult for the composite oxide containing nickel as a main constituent than the composite oxide containing cobalt as a main constituent to bring about an oxidation reaction for a change from bivalence to trivalence, thus easier to generate NiO to cause oxygen deficiency.

BRIEF SUMMARY OF THE INVENTION

In order to enhance stability of an active material in an overcharged state, which is used for a positive electrode of a non-aqueous electrolyte secondary battery, and to improve the safety of the battery, it is required that a composite oxide as an active material maintain a hexagonal system and not phase-transfer to a monoclinic system in an overcharged state having a potential over 4.25 V relative to metallic Li. It is further necessary to prevent, as far as possible, generation of oxygen at a high temperature since a thermal runaway of a non-aqueous electrolyte secondary battery in an overcharged state occurs as triggered by a reaction between an electrolyte and oxygen discharged from a positive electrode active material having an unstable structure.

The present invention has been made in view of what was described above, and relates to a positive electrode active material for a non-aqueous electrolyte secondary battery, comprising a lithium-containing composite oxide, wherein the composite oxide has a crystal structure attributed to a hexagonal system in an overcharged state having a potential over 4.25 V relative to metallic Li, and a maximum value of an oxygen generation peak in a gas chromatograph mass spectrometry measurement of the composite oxide in the aforesaid overcharged state is in the range of 330 to 370° C.

The present invention also relates to a positive electrode active material for a non-aqueous electrolyte secondary battery, comprising a lithium-containing composite oxide, wherein the composite oxide is represented by the general formula: $Li_zCo_{1-x-y}Mg_xM_yO_2$ the element M included in the general formula is at least one selected from the group consisting of Al, Ti, Sr, Mn, Ni and Ca, the values x, y and z included in the general formula satisfy: (i) $0 \leq z \leq 1.03$; (ii) $0.005 \leq x \leq 0.1$; and (iii) $0.001 \leq y \leq 0.03$, the composite oxide has a crystal structure attributed to a hexagonal system in an overcharged state having a potential over 4.25 V relative to metallic Li, and a maximum value of an oxygen generation peak in a gas chromatograph mass spectrometry measurement of the composite oxide in the aforesaid overcharged state is in the range of 330 to 370° C.

The present invention also relates to a non-aqueous electrolyte secondary battery, comprising: a positive electrode which comprises any of the aforesaid positive electrode active materials; a negative electrode; a separator interposed between the positive electrode and the negative electrode; and a non-aqueous electrolyte.

It is preferable that in the non-aqueous electrolyte secondary battery, an end-of-charge voltage in a normal operating state be set to 4.25 V or higher. It can for example be set to 4.3 V, 4.35 V, 4.4 V, and the like.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
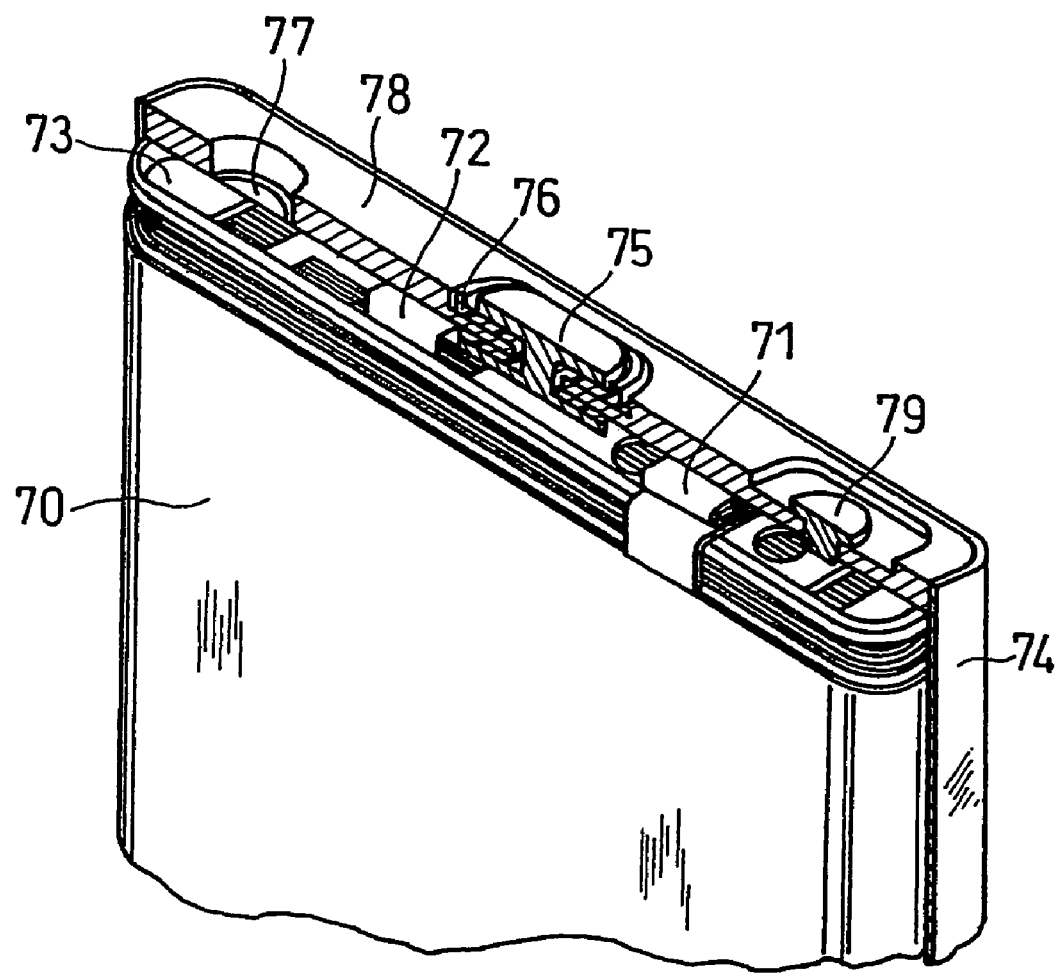
FIG. 1 is a partially cutaway oblique view of a non-aqueous electrolyte secondary battery in accordance with the present invention.

A positive electrode active material for a non-aqueous electrolyte secondary battery of the present invention comprises a lithium-containing composite oxide, and the composite oxide has a crystal structure attributed to a hexagonal system in an overcharged state having a potential over 4.25 V relative to metallic Li. Namely, the lithium-containing composite oxide in accordance with the present invention can maintain a hexagonal system even in an overcharged state having a potential over 4.25 V relative to metallic Li whereas the conventional lithium-containing composite oxide has a monoclinic crystal structure in the aforesaid overcharged state.

When a lithium-containing composite oxide maintains a hexagonal system even in an overcharged state, a whole crystal becomes resistant to distortion, thereby inhibiting decomposition of the active material and a thermal runaway of a battery. When the composite oxide in an overcharged state is subjected to a gas chromatography mass spectrometry (hereinafter referred to as GC/MS) measurement, a maximum value of an oxygen generation peak exists in the range of 330 to 370° C. Suppose that the maximum value of the oxygen generation peak is below 330° C., the rate of the hexagonal system maintained in the composite oxide in an overcharged state decreases, or it is hard to say that the distortion within the crystal is sufficiently small. There may therefore be possibility that the thermal runaway occurs in the battery in an overcharged state.

It should be noted that the maximum value of the oxygen generation peak is preferably 340° C. or higher.

In the following exemplified are some of the embodiments of the present invention.

As the preferable lithium-containing composite oxide in accordance with the present invention cited can be one represented by the general formula: $Li_zCo_{1-x-y}Mg_xM_yO_2$, wherein the element M included in the general formula is at least one selected from the group consisting of Al, Ti, Sr, Mn, Ni and Ca, and the values x, y and z included in the general formula satisfy: (i) $0 \leq z \leq 1.03$; (ii) $0.005 \leq x \leq 0.1$; and (iii) $0.001 \leq y \leq 0.03$. It is to be noted that the value z varies depending on the charge/discharge of the battery.

In the general formula immediately after the synthesis of the composite oxide, it is preferable that the value z satisfy: $1.0 \leq z \leq 1.03$. In this case, even with raw materials for the active material baked at a high temperature, occurrence of lithium deficiency in the active material is inhibited, allowing production of an active material having a high structural stability. When z exceeds 1.03, lithium becomes excess to cause the active material to demonstrate relatively strong alkalinity, which results in impairment of stability during formation of an electrode, and may result in corrosion of an Al core member. When the value "z" after the synthesis is 1.0 or larger, the effect of inhibiting the occurrence of lithium deficiency can be obtained, but it is particularly preferable that z be 1.01 or larger in order to further enhance the structural stability of the active material.

When z is below 1, on the other hand, lithium required for synthesis of a high-performance active material runs short. Namely, a content of by-products, such as $Co_3O_4$, MgO or an oxide of the element M, in the active material increases, leading to gas generation within the battery due to $Co_3O_4$ or MgO, deterioration in thermal stability of the active material due to a relatively decreased amount of Mg in the active material, capacity reduction, or the like.

Magnesium is considered as being highly combinative to oxygen. It is therefore possible to obtain the effect of inhibiting occurrence of oxygen deficiency in the active material by addition of a magnesium source into a raw material mixture of the active material. Magnesium is also considered as having the effect of inhibiting sintering of particles in synthesis of the active material.

As thus described, the occurrence of lithium deficiency in the active material is inhibited by making the amount of Li, contained in the raw material mixture, excess, and furthermore, the occurrence of oxygen deficiency is also inhibited by addition of Mg. With the effect of the excessive Li and the effect of the added Mg simultaneously exerted, the raw material mixture can be baked at an extremely high temperature. That is to say, even when an active material is baked at a high temperature of 1000° C. or higher, which has not hitherto been implemented, the occurrences of lithium deficiency and oxygen deficiency can be significantly inhibited. As a result of the baking at a high temperature, an active material having extremely high crystallinity and excellent structural stability can be produced.

It is necessary for obtaining the aforesaid effect of Mg that x satisfy: $0.005 \leq x \leq 0.1$. When x is below 0.005, the Mg amount is too small for sufficiently obtaining the effect. When x is over 0.1, on the other hand, the Mg amount is so large as to raise a question of decreased capacity of the active material. In the range where the capacity decrease is allowable, however, a larger Mg amount is more preferable, and the x value preferably satisfies: $0.08 \leq x$.

The element M is required for improvement of a cycle characteristic. Among Al, Ti, Sr, Mn, Ni and Ca, it is particularly preferable to use Al, Mn or Ni. While it is necessary to satisfy at least: $0.001 \leq y$ for obtaining the effect of the element M, when $0.03 < y$, a problem arises as to a decrease in active material capacity.

The composite oxide in accordance with the present invention, represented by the general formula: $Li_zCo_{1-x-y}Mg_xM_yO_2$, is synthesized, for example, by a production method comprising: a step (a) for preparing a raw material mixture; and a step (b) for baking the resultant raw material mixture in an oxidization atmosphere at 1000 to 1100° C., as described below.

The raw material mixture comprises a lithium source, a cobalt source, a magnesium source and an element M source. However, two or more sources selected from the cobalt source, the magnesium source and the element M source may form a compound. For example, a eutectic hydroxide, or a eutectic oxide, of cobalt and magnesium can be used for the cobalt source and the magnesium source; a eutectic hydroxide, or a eutectic oxide, of cobalt, magnesium and the element M can be used for the cobalt source, the magnesium source and the element M source.

As for the lithium source used can be lithium carbonate, lithium hydroxide, lithium nitrate, lithium sulfate, lithium oxide or the like. These may be used singly or in combination of two or more of them.

As for the cobalt source used can be basic cobalt carbonate, cobalt hydroxide, cobalt nitrate, cobalt sulfate, cobalt oxide, cobalt fluoride, or the like. These may be used singly or in combination of two or more of them.

As for the magnesium source used can be magnesium oxide, basic magnesium carbonate, magnesium chloride, magnesium fluoride, magnesium nitrate, magnesium sulfate, magnesium acetate, magnesium oxalate, magnesium sulfide, magnesium hydroxide, or the like. These may be used singly or in combination of two or more of them.

As for the element M source, below-described ones can for example be used.

As for an aluminum source used can be aluminum hydroxide, aluminum nitrate, aluminum oxide, aluminum fluoride, aluminum sulfate, or the like. These may be used singly or in combination of two or more of them.

As for a titanium source used can be titanium oxide, titanium fluoride, or the like. These may be used singly or in combination of two or more of them.

As for a strontium source used can be strontium oxide, strontium chloride, strontium carbonate, strontium oxalate, strontium fluoride, strontium sulfate, strontium nitrate, strontium hydroxide, strontium sulfide, or the like. These may be used singly or in combination of two or more of them.

As for a manganese source used can be manganese oxide, manganese hydroxide, manganese carbonate, manganese nitrate, manganese sulfate, manganese fluoride, manganese chloride, manganese oxyhydroxide, or the like. These may be used singly or in combination of two or more of them.

As for a nickel source used can be nickel hydroxide, nickel carbonate, nickel nitrate, nickel sulfate, nickel chloride, nickel oxide, or the like. These may be used singly or in combination of two or more of them.

As for a calcium source used can be calcium oxide, calcium chloride, calcium carbonate, calcium fluoride, calcium nitrate, calcium sulfate, calcium sulfide, calcium hydroxide, or the like. These may be used singly or in combination of two or more of them.

In the step (a), a raw material mixture (0<n), containing "nx" mol of magnesium, "ny" mol of the element M, "n(1-x-y)" mol of cobalt and "nz" mol of lithium, is prepared such that the values x, y and z satisfy: (i) $1.0 \leq z \leq 1.03$; (ii) $0.005 \leq x \leq 0.1$; and (iii) $0.001 \leq y \leq 0.03$.

In the step (b), the prepared raw material mixture was baked in an oxidization atmosphere at 1000 to 1100° C. When the baking temperature is below 1000° C., it is difficult to enhance crystallinity of the active material from the conventional level, and hence it is impossible to obtain a highly excellent active material capable of maintaining a hexagonal system even in an overcharged state. When the baking temperature exceeds 1100° C., on the other hand, it becomes difficult to inhibit the lithium deficiency and the oxygen deficiency, causing deterioration in structural stability of the active material. The baking is preferably conducted for 5 to 20 hours.

In the production method of the present invention, it is possible to further inhibit the oxygen deficiency by re-baking the baked matter in an oxidation atmosphere at 300 to 750° C. after the step (b). For obtaining the effect of further inhibiting the oxygen deficiency, it is effective to re-bake the baked matter for 5 to 10 hours, while it depends on the baking temperature. It is preferable that the re-baking be conducted in an oxygen atmosphere or in an air atmosphere.

Materials conventionally in use for non-aqueous electrolyte secondary batteries can be used, without any specific limitation, for the negative electrode, the separator, the non-aqueous electrolyte, and the positive electrode material other than the positive electrode active material. The positive electrode can for example comprise a conductive material made of carbon black, a binder made of a resin, and the like. The negative electrode can comprise a carbon material such as graphite, a binder made of a resin, and the like. For the separator used can be a woven fabric or a non-woven fabric which are made of polyolefin, polyamide or the like. For the non-aqueous electrolyte used can be a non-aqueous solvent with a lithium salt dissolved therein.

Next, the present invention is described based on examples; however, the present invention is not limited thereto.

EXAMPLE 1

(i) Preparation of Positive Electrode Active Material

A eutectic hydroxide with cobalt and magnesium incorporated therein at a mole ratio of 0.945:0.05 was prepared.

The prepared eutectic hydroxide was mixed with aluminum hydroxide and lithium carbonate to obtain a raw material mixture containing cobalt, magnesium, aluminum and lithium at a mole ratio of 0.945:0.05:0.005:1.01.

Next, the obtained raw material mixture was baked in an air atmosphere at 1050° C. for 10 hours to obtain a positive electrode active material: $Li_{1.01}Co_{0.945}Mg_{0.05}Al_{0.005}O_2$. This active material satisfies: z=1.01, x=0.05 and y=0.005.

(ii) Production of Positive Electrode 100 parts by weight of the above obtained $Li_{1.01}Co_{0.945}Mg_{0.05}Al_{0.005}O_2$ was added with 3 parts by weight of acetylene black as a conductive agent, 7 parts by weight of polytetrafluoroethylene as a binder, and 100 parts by weight of a 1 wt % carboxymethyl cellulose aqueous solution, which was stirred and mixed to obtain a paste-like positive electrode material mixture. Subsequently, the positive electrode material mixture was applied onto each face of a core member made of aluminum foil having a thickness of 30 μm, followed by drying. The dried coated film together with the core member was rolled by pressure with a roller, which was then cut into a prescribed size to obtain a positive electrode. An aluminum-made positive electrode lead was welded to the obtained positive electrode.

(iii) Production of Negative Electrode

Flake graphite was ground and classified so as to have a mean particle size of about 20 μm. 100 parts by weight of the obtained flake graphite was added with 3 parts by weight of styrene/butadiene rubber as a binder and 100 parts by weight of a 1 wt % carboxymethyl cellulose aqueous solution, which was stirred and mixed to obtain a paste-like negative electrode material mixture. Subsequently, the negative electrode material mixture was applied onto each face of a core member made of copper foil having a thickness of 20 µm, followed by drying. The dried coated film together with the core member was rolled by pressure with a roller, which was then cut into a prescribed size to obtain a negative electrode. A nickel-made negative electrode lead was welded to the obtained negative electrode.

(iv) Non-Aqueous Electrolyte $LiBF_4$ was dissolved, at a concentration of 1 mol/L, in a mixed solvent of 30 volume % of ethylene carbonate and 70 volume % of γ-butyrolactone, to prepare a non-aqueous electrolyte.

(v) Assembly of Battery

A prismatic lithium-ion secondary battery having a nominal capacity of 850 mAh as shown in FIG. 1 was assembled.

First, the positive electrode and the negative electrode were wound up via a separator made of a microporous polyethylene resin having a thickness of 25 µm to constitute an electrode assembly 70. An aluminum-made positive electrode lead 71 and a nickel-made negative electrode lead 72 were welded to the positive electrode and the negative electrode, respectively. An insulating plate 73 made of a polyethylene resin was applied onto the upper part of the electrode assembly, to be housed in a battery case 74. The other end of the positive electrode lead was spot-welded to the under surface of a sealing plate 78 having a prescribed safety valve 77. The other end of the negative electrode lead was electrically connected to the lower part of a nickel-made negative electrode terminal 75 having been inserted, via an insulating material 76, into a terminal aperture arranged in the central portion of the sealing plate. The open-end part of the battery case was laser-welded to the peripheral part of the sealing plate, and thereafter, a prescribed amount of the non-aqueous electrolyte was infused through an inlet provided in the sealing plate. Finally, the inlet was closed with an aluminum-made sealing stopper 79 and then closely sealed by laser-welding to complete a battery.

(vi) Evaluation

X-Ray Diffraction Measurement

The obtained battery was charged at a current value of 1C until a battery voltage became 4.2 V, 4.45 V, 4.6 V or 4.8 V. The battery in the overcharged state was then dismantled for taking the positive electrode out so that the positive electrode material mixture was obtained therefrom.

Subsequently, the positive electrode material mixture was analyzed by an X-ray diffraction measurement. As a measurement device used here was "X' Pert", manufactured by Royal Philips Electronics. Measurement conditions were: a tube voltage of 40 kV, a tube current of 50 mA, a step width of 0.02°, a scanning rate of 0.5 s/step, a slit width (DS/SS/RS) of 1°/1°/0.03 mm, and a measurement range of 10 to 80°.

Figure 2:
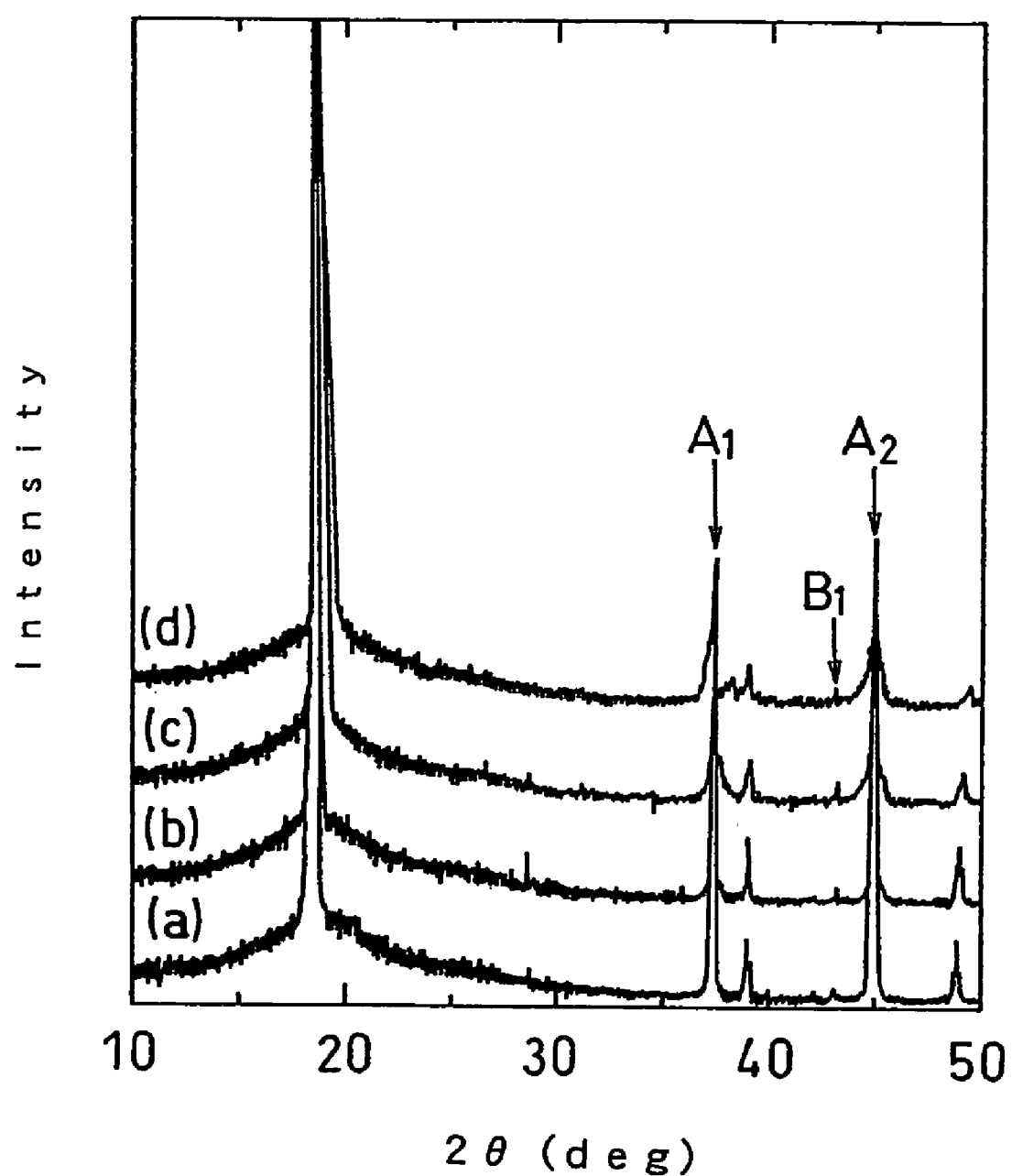
FIG. 2 is a graph showing X-ray diffraction patterns (a), (b), (c) and (d) of a positive electrode active material in charged states with battery voltages of 4.2 V, 4.45 V, 4.6 V and 4.8 V, respectively, in accordance with Example 1.

FIG. 2 shows the obtained X-ray diffraction patterns. In FIG. 2, the patterns (a), (b), (c) and (d) were obtained when the battery was charged until the battery voltage became 4.2 V, 4.45 V, 4.6 V and 4.8 V, respectively. It should be noted that the peaks $A_1$ and $A_2$ were attributed to a hexagonal system while the peak $B_1$ was attributed to a monoclinic system.

As apparent from FIG. 2, all of the positive electrode material mixtures of the present example substantially exhibit a hexagonal pattern. It is therefore found that the positive electrode active material of the present invention is highly excellent in stability as being resistant to decomposition even in the overcharged state with the battery voltage of 4.8 V.

GC/MS Measurement

The obtained battery was charged at a current value of 1C until the battery voltage became 4.7 V. The battery in an overcharged state was then dismantled for taking the positive electrode out so that the positive electrode material mixture was obtained therefrom.

Subsequently, in a GC/MS measurement, the temperature of the positive electrode material mixture was raised from room temperature to 500° C., and the oxygen generation behavior was observed. As a measurement device used here was "5973", manufactured by Agilent Technologies. Measurement conditions were: a heating-up rate of 10° C./minute, a mass-range of 10 to 150, and a scanning rate of 4.31 s/scan.

Figure 3:
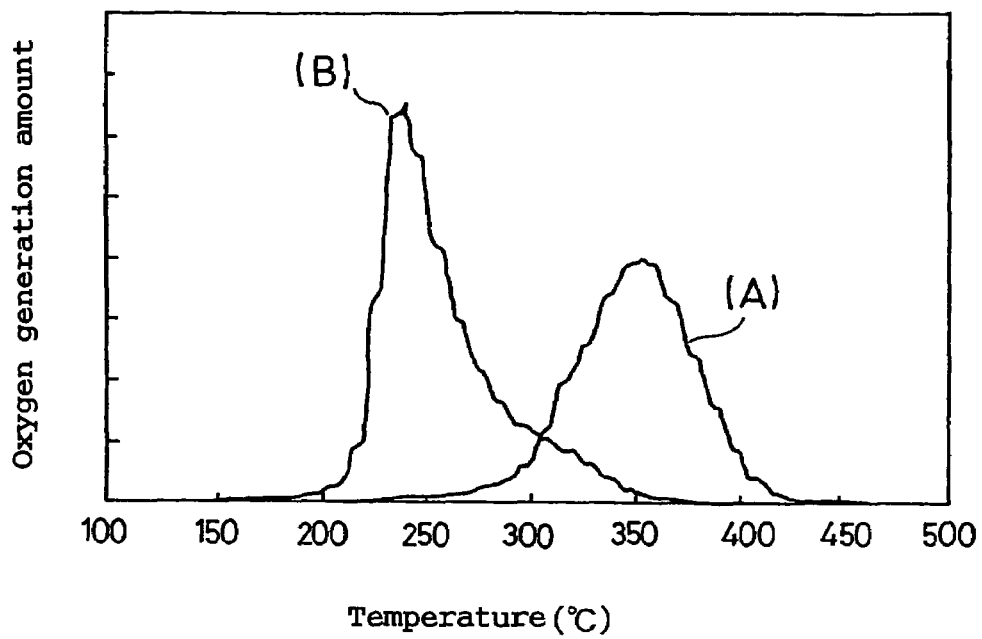
FIG. 3 is a graph showing oxygen generation spectra (A) and (B) in GC/MS measurements of the positive electrode active materials in an overcharged state in accordance with Example 1 and Comparative Example 1, respectively.

The oxygen generation spectrum (A) obtained here is shown in FIG. 3.

As clear from FIG. 3, in the spectrum (A), the maximum value of the oxygen generation peak appears at temperatures higher than 350° C. It is thereby revealed that the positive electrode active material of the present invention is highly excellent in stability as being resistant to decomposition and oxygen generation even when exposed to a high temperature in the overcharged state with the battery voltage of 4.7 V.

Differential Scanning Calorimetry

The obtained battery was charged at a current value of 1C until the battery voltage became 4.7 V. The battery in an overcharged state was then dismantled for taking the positive electrode out so that the positive electrode material mixture was obtained therefrom.

Subsequently, by the use of a device for differential scanning calorimetry, the temperature of the positive electrode material mixture was raised from room temperature at a rate of 5° C./minute, and the weight decrease behavior was observed. The weight decrease spectrum (X) obtained here is shown in FIG. 4.

Figure 4:
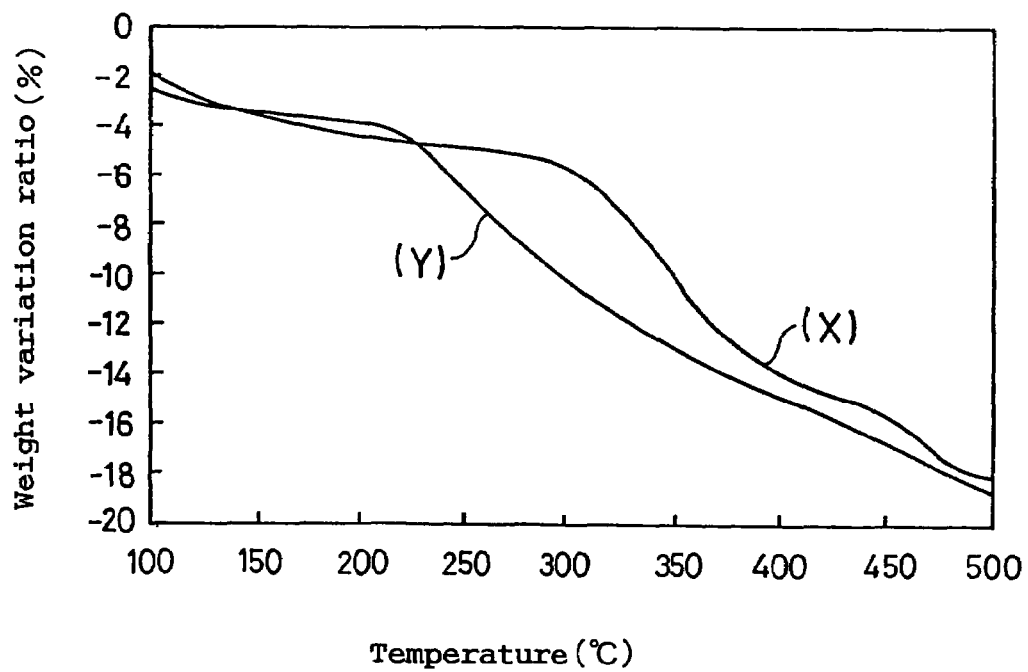
FIG. 4 is a graph showing weight decrease spectra (X) and (Y) in differential scanning calorimetries of the positive electrode active materials in the overcharged state in accordance with Example 1 and Comparative Example 1, respectively.

As apparent from FIG. 4, in the spectrum (X), the weight began to decrease at about 300° C. This result corresponds well to the result obtained by the GC/MS measurement. It is therefore found that the positive electrode active material of the present invention is highly excellent in stability as being resistant to decomposition and oxygen generation even when exposed to a high temperature in the overcharged state with the battery voltage of 4.7 V.

EXAMPLES 2 TO 6

In Examples 2 to 6, in preparation of positive electrode active materials, titanium oxide, strontium hydroxide, manganese oxide, nickel hydroxide and calcium hydroxide were used, respectively, in place of aluminum hydroxide.

In the same manner as in Example 1 except for what was described above obtained respectively were: the positive electrode active material: $Li_{1.01}Co_{0.945}Mg_{0.05}Ti_{0.005}O_2$ in Example 2; the positive electrode active material: $Li_{1.01}Co_{0.945}Mg_{0.05}Sr_{0.005}O_2$ in Example 3; the positive electrode active material: $Li_{1.01}Co_{0.945}Mg_{0.05}Mn_{0.005}O_2$ in Example 4; the positive electrode active material: $Li_{1.01}Co_{0.945}Mg_{0.05}Ni_{0.005}O_2$ in Example 5; and the positive electrode active material: $Li_{1.01}Co_{0.945}Mg_{0.05}Ca_{0.005}O_2$ in Example 6.

These active materials satisfy: $z=1.01$, $x=0.05$ and $y=0.005$.

In each of Examples, a prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 1.

TABLE 1

| | Composition | z | Baking Temp. | GC/MS Max. |
|---|---|---|---|---|
| Ex. 1 | $Li_{1.01}Co_{0.945}Mg_{0.05}Al_{0.005}O_2$ | 1.01 | 1050° C. | 355° C. |
| Ex. 2 | $Li_{1.01}Co_{0.945}Mg_{0.05}Ti_{0.005}O_2$ | 1.01 | 1050° C. | 352° C. |
| Ex. 3 | $Li_{1.01}Co_{0.945}Mg_{0.05}Sr_{0.005}O_2$ | 1.01 | 1050° C. | 356° C. |
| Ex. 4 | $Li_{1.01}Co_{0.945}Mg_{0.05}Mn_{0.005}O_2$ | 1.01 | 1050° C. | 350° C. |
| Ex. 5 | $Li_{1.01}Co_{0.945}Mg_{0.05}Ni_{0.005}O_2$ | 1.01 | 1050° C. | 350° C. |
| Ex. 6 | $Li_{1.01}Co_{0.945}Mg_{0.05}Ca_{0.005}O_2$ | 1.01 | 1050° C. | 357° C. |

EXAMPLE 7

Except that the raw material mixture was baked in an air atmosphere at 1050° C. for 10 hours and then re-baked in an air atmosphere at 700° C. for 10 hours, a positive electrode active material: $Li_{1.01}Co_{0.945}Mg_{0.05}Al_{0.005}O_2$ was obtained in the same manner as in Example 1. This active material satisfies: z=1.01, x=0.05, y=0.005.

A prismatic lithium ion secondary battery was assembled in the same manner as in Example 1 except for the use of the above obtained active material, and the stability of the battery when overcharged was evaluated by the GC/MS measurement in the same manner as in Example 1. The result is shown in Table 2.

EXAMPLES 8 TO 12

In Examples 8 to 12, in preparation of positive electrode active materials, titanium oxide, strontium hydroxide, manganese oxide, nickel hydroxide and calcium hydroxide were used, respectively, in place of aluminum hydroxide.

In the same manner as in Example 7 except for what was described above obtained respectively were: the positive electrode active material: $Li_{1.01}Co_{0.945}Mg_{0.05}Ti_{0.005}O_2$ in Example 8; the positive electrode active material: $Li_{1.01}Co_{0.945}Mg_{0.05}Sr_{0.005}O_2$ in Example 9; the positive electrode active material: $Li_{1.01}Co_{0.945}Mg_{0.05}Mn_{0.005}O_2$ in Example 10; the positive electrode active material: $Li_{1.01}Co_{0.945}Mg_{0.05}Ni_{0.005}O_2$ in Example 11; and the positive electrode active material: $Li_{1.01}Co_{0.945}Mg_{0.05}Ca_{0.005}O_2$ in Example 12.

These active materials satisfy: z=1.01, x=0.05 and y=0.005.

In each of Examples, a prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 2.

COMPARATIVE EXAMPLE 1

Cobalt oxide as a cobalt source and lithium carbonate as a lithium source were mixed to obtain a raw material mixture containing cobalt and lithium at a mole ratio of 1:1.01.

Next, the obtained raw material mixture was baked in an air atmosphere at 900° C. for 10 hours to obtain a positive electrode active material: $Li_{1.01}CoO_2$.

A prismatic lithium-ion secondary battery was assembled in the same manner as in Example 1 except for the use of the active material obtained here, and the assembled battery was evaluated in the same manner as in Example 1.

Figure 5:
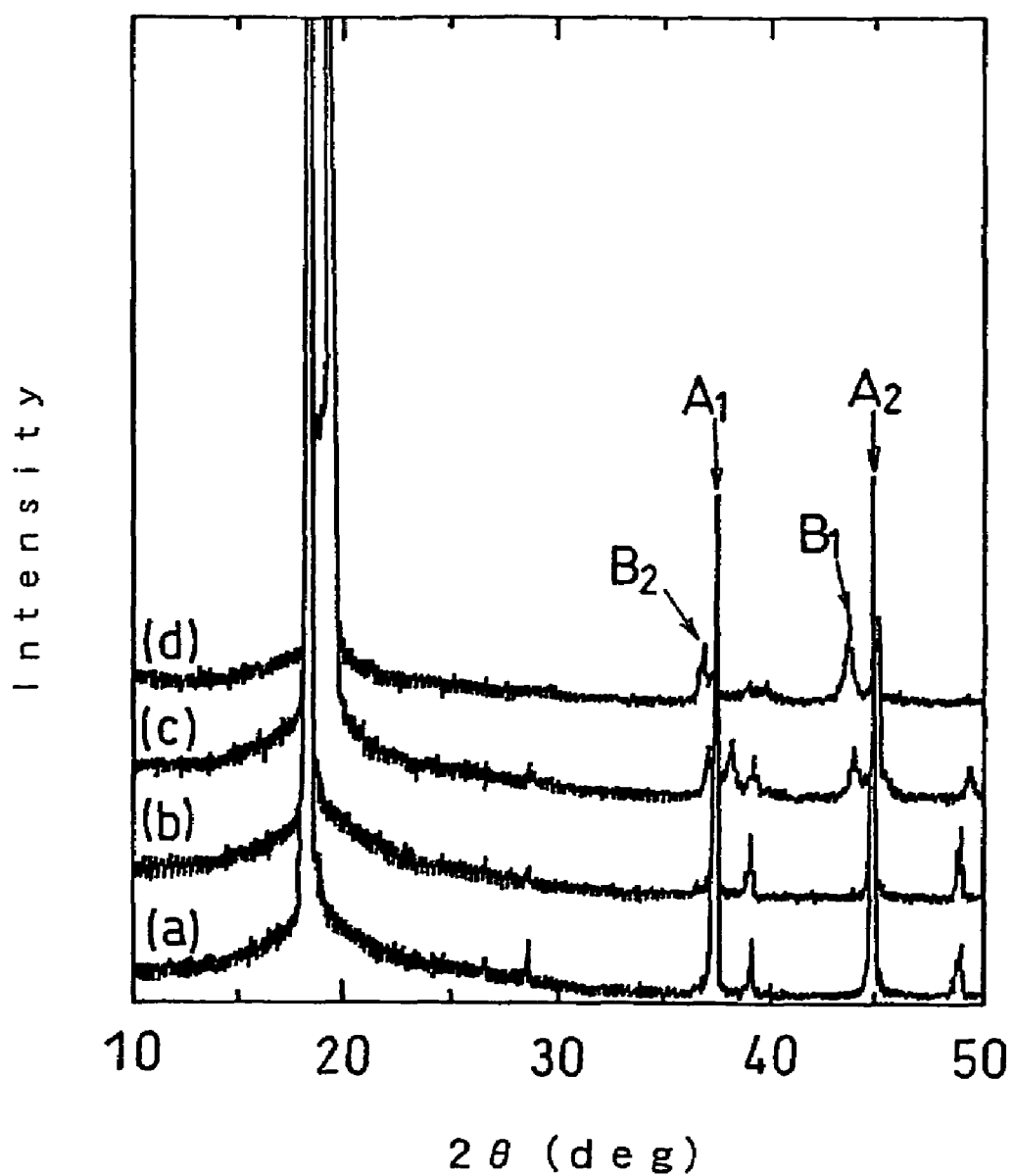
FIG. 5 is a graph showing X-ray diffraction patterns (a), (b), (c) and (d) of a positive electrode active material in charged states with battery voltages of 4.2 V, 4.45 V, 4.6 V and 4.8 V, respectively, in accordance with Comparative Example 1.

FIG. 5 shows the obtained X-ray diffraction patterns. In FIG. 5, the patterns (a), (b), (c) and (d) were obtained when the battery was charged until the battery voltage became 4.2 V, 4.45 V, 4.6 V and 4.8 V, respectively. It should be noted that the peaks $A_1$ and $A_2$ were attributed to a hexagonal system while the peaks $B_1$ and $B_2$ were attributed to a monoclinic system.

As apparent from FIG. 5, the patterns (b), (c) and (d) exhibit the monoclinic pattern. Accordingly, it is found highly possible that the positive electrode active material of the present comparative example easily decomposes in an overcharged state over 4.2 V.

FIG. 3 shows the oxygen generation spectrum (B) obtained by the GC/MS measurement of the active material in an overcharged state in which the battery was charged until the battery voltage reached 4.7 V.

As clear from FIG. 3, in the spectrum (B), the maximum value of the oxygen generation peak appears at temperatures lower than 250° C. Accordingly, it is found highly possible that the positive electrode active material of the present comparative example decomposes while generating oxygen when exposed to a high temperature in an overcharged state.

FIG. 4 shows the weight decrease spectrum (Y) obtained by the differential scanning calorimetry of the active material in an overcharged state in which the battery was charged until the battery voltage reached 4.7 V.

As apparent from FIG. 4, in the spectrum (Y), the weight began to decrease at about 200° C. This result corresponds well to the result obtained by the GC/MS measurement. Accordingly, it is found highly possible that the positive electrode active material of the present comparative example decomposes while generating oxygen when exposed to a high temperature in an overcharged state.

COMPARATIVE EXAMPLE 2

A raw material mixture prepared in the same manner as in Comparative Example 1 was baked in an air atmosphere at 1050° C. for 10 hours to obtain a positive electrode active material: $Li_{1.01}CoO_2$.

A prismatic lithium-ion secondary battery was assembled in the same manner as in Example 1 except for the use of the active material obtained here, and the stability of the battery

TABLE 2

| | Composition | z | Baking Temp. | Re-baking Temp. | GC/MS Max. |
|---|---|---|---|---|---|
| Ex. 7 | $Li_{1.01}Co_{0.945}Mg_{0.05}Al_{0.005}O_2$ | 1.01 | 1050° C. | 700° C. | 360° C. |
| Ex. 8 | $Li_{1.01}Co_{0.945}Mg_{0.05}Ti_{0.005}O_2$ | 1.01 | 1050° C. | 700° C. | 358° C. |
| Ex. 9 | $Li_{1.01}Co_{0.945}Mg_{0.05}Sr_{0.005}O_2$ | 1.01 | 1050° C. | 700° C. | 362° C. |
| Ex. 10 | $Li_{1.01}Co_{0.945}Mg_{0.05}Mn_{0.005}O_2$ | 1.01 | 1050° C. | 700° C. | 358° C. |
| Ex. 11 | $Li_{1.01}Co_{0.945}Mg_{0.05}Ni_{0.005}O_2$ | 1.01 | 1050° C. | 700° C. | 358° C. |
| Ex. 12 | $Li_{1.01}Co_{0.945}Mg_{0.05}Ca_{0.005}O_2$ | 1.01 | 1050° C. | 700° C. | 364° C. | when overcharged was evaluated by the GC/MS measurement in the same manner as in Example 1. The result is shown in Table 3.

COMPARATIVE EXAMPLE 3

A raw material mixture prepared in the same manner as in Comparative Example 1 was baked in an air atmosphere at 1050° C. for 10 hours, and then baked in an air atmosphere at 700° C. for 10 hours to obtain a positive electrode active material: $Li_{1.01}CoO_2$.

A prismatic lithium-ion secondary battery was assembled in the same manner as in Example 1 except for the use of the active material obtained here, and the stability of the battery when overcharged was evaluated by the GC/MS measurement in the same manner as in Example 1. The result is shown in Table 3.

TABLE 3

| Composition | z | Baking Temp. | Re-baking Temp. | GC/MS Max. |
|---|---|---|---|---|
| Comp. Ex. 1 $Li_{1.01}CoO_2$ | 1.01 | 900° C. | — | 241° C. |
| Comp. Ex. 2 $Li_{1.01}CoO_2$ | 1.01 | 1050° C. | — | 243° C. |
| Comp. Ex. 3 $Li_{1.01}CoO_2$ | 1.01 | 1050° C. | 700° C. | 248° C. |

COMPARATIVE EXAMPLE 4

A raw material mixture prepared in the same manner as in Example 1 was baked in an air atmosphere at 900° C. for 10 hours to obtain a positive electrode active material: $Li_{1.01}Co_{0.945}Mg_{0.05}Al_{0.005}O_2$. This active material satisfies: z=1.01, x=0.05, y=0.005.

A prismatic lithium-ion secondary battery was assembled in the same manner as in Example 1 except for the use of the active material obtained here, and the stability of the battery when overcharged was evaluated by the GC/MS measurement in the same manner as in Example 1. The result is shown in Table 4.

COMPARATIVE EXAMPLES 5 to 9

In Comparative Examples 5 to 9, in preparation of positive electrode active materials, titanium oxide, strontium hydroxide, manganese oxide, nickel hydroxide and calcium hydroxide were used, respectively, in place of aluminum hydroxide.

In the same manner as in Comparative Example 4 except for what was described above obtained respectively were: the positive electrode active material: $Li_{1.01}Co_{0.945}Mg_{0.05}Ti_{0.005}O_2$ in Comparative Example 5; the positive electrode active material: $Li_{1.01}Co_{0.945}Mg_{0.05}Mn_{0.005}O_2$ in Comparative Example 6; the positive electrode active material: $Li_{1.01}Co_{0.945}Mg_{0.05}Mn_{0.005}O_2$ in Comparative Example 7; the positive electrode active material: $Li_{1.01}Co_{0.945}Mg_{0.05}Ni_{0.005}O_2$ in Comparative Example 8; and the positive electrode active material: $Li_{1.01}Co_{0.945}Mg_{0.05}Ca_{0.005}O_2$ in Comparative Example 9.

These active materials satisfy: z=1.01, x=0.05 and y=0.005.

In each of Comparative Examples, a prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 4.

TABLE 4

| | Composition | z | Baking Temp. | GC/MS Max. |
|---|---|---|---|---|
| Comp. Ex. 4 | $Li_{1.01}Co_{0.945}Mg_{0.05}Al_{0.005}O_2$ | 1.01 | 900° C. | 265° C. |
| Comp. Ex. 5 | $Li_{1.01}Co_{0.945}Mg_{0.05}Ti_{0.005}O_2$ | 1.01 | 900° C. | 260° C. |
| Comp. Ex. 6 | $Li_{1.01}Co_{0.945}Mg_{0.05}Sr_{0.005}O_2$ | 1.01 | 900° C. | 265° C. |
| Comp. Ex. 7 | $Li_{1.01}Co_{0.945}Mg_{0.05}Mn_{0.005}O_2$ | 1.01 | 900° C. | 261° C. |
| Comp. Ex. 8 | $Li_{1.01}Co_{0.945}Mg_{0.05}Ni_{0.005}O_2$ | 1.01 | 900° C. | 260° C. |
| Comp. Ex. 9 | $Li_{1.01}Co_{0.945}Mg_{0.05}Ca_{0.005}O_2$ | 1.01 | 900° C. | 263° C. |

COMPARATIVE EXAMPLE 10

A eutectic hydroxide prepared in the same manner as in Example 1 was mixed with aluminum hydroxide and lithium carbonate to obtain a raw material mixture containing cobalt, magnesium, aluminum and lithium at a mole ratio of 0.945:0.05:0.005:0.97.

Next, the obtained raw material mixture was baked in an air atmosphere at 1050° C. for 10 hours to obtain a positive electrode active material: $Li_{0.97}Co_{0.945}Mg_{0.05}Al_{0.005}O_2$. This active material satisfies: z=0.97, x=0.05 and y=0.005.

A prismatic lithium-ion secondary battery was assembled in the same manner as in Example 1 except for the use of the active material obtained here, and the stability of the battery when overcharged was evaluated by the GC/MS measurement in the same manner as in Example 1. The result is shown in Table 5.

COMPARATIVE EXAMPLES 11 to 15

In Comparative Examples 11 to 15, in preparation of positive electrode active materials, titanium oxide, strontium hydroxide, manganese oxide, nickel hydroxide and calcium hydroxide were used, respectively, in place of aluminum hydroxide.

In the same manner as in Comparative Example 10 except for what was described above obtained respectively were: the positive electrode active material: $Li_{0.97}Co_{0.945}Mg_{0.05}Sr_{0.005}O_2$ in Comparative Example 11; the positive electrode active material: $Li_{0.97}Co_{0.945}Mg_{0.05}Al_{0.005}O_2$ in Comparative Example 12; the positive electrode active material: $Li_{0.97}Co_{0.945}Mg_{0.05}Mn_{0.005}O_2$ in Comparative Example 13; the positive electrode active material: $Li_{0.97}Co_{0.945}Mg_{0.05}Ni_{0.005}O_2$ in Comparative Example 14; and the positive electrode active material: $Li_{0.97}Co_{0.945}Mg_{0.05}Ca_{0.005}O_2$ in Comparative Example 15.

These active materials satisfy: z=0.97, x=0.05 and y=0.005.

In each of Comparative Examples, a prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 5.

TABLE 5

| | Composition | z | Baking Temp. | GC/MS Max. |
|---|---|---|---|---|
| Comp. Ex. 10 | $Li_{0.97}Co_{0.945}Mg_{0.05}Al_{0.005}O_2$ | 0.97 | 1050° C. | 269° C. |
| Comp. Ex. 11 | $Li_{0.97}Co_{0.945}Mg_{0.05}Ti_{0.005}O_2$ | 0.97 | 1050° C. | 266° C. |
| Comp. Ex. 12 | $Li_{0.97}Co_{0.945}Mg_{0.05}Sr_{0.005}O_2$ | 0.97 | 1050° C. | 270° C. |
| Comp. Ex. 13 | $Li_{0.97}Co_{0.945}Mg_{0.05}Mn_{0.005}O_2$ | 0.97 | 1050° C. | 266° C. |
| Comp. Ex. 14 | $Li_{0.97}Co_{0.945}Mg_{0.05}Ni_{0.005}O_2$ | 0.97 | 1050° C. | 265° C. |
| Comp. Ex. 15 | $Li_{0.97}Co_{0.945}Mg_{0.05}Ca_{0.005}O_2$ | 0.97 | 1050° C. | 269° C. |

EXAMPLES 13 TO 15 AND COMPARATIVE EXAMPLES 16 to 18

Next, a more detailed study was conducted on a baking temperature for a raw material mixture.

Specifically, a positive electrode active material: $Li_{1.01}Co_{0.945}Mg_{0.05}Al_{0.005}O_2$ was obtained in the same manner as in Example 1 except that the baking temperature for the raw material mixture was varied as shown in Table 6. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 6.

As seen in Table 6, when the baking temperature was in a low temperature region below 1000° C., and in a high temperature region over 1100° C., the stability of the active material during overcharging significantly deteriorated.

TABLE 6

| | Composition | z | Baking Temp. | GC/MS Max. |
|---|---|---|---|---|
| Comp. Ex. 16 | $Li_{1.01}Co_{0.945}Mg_{0.05}Al_{0.005}O_2$ | 1.01 | 900° C. | 265° C. |
| Comp. Ex. 17 | $Li_{1.01}Co_{0.945}Mg_{0.05}Al_{0.005}O_2$ | 1.01 | 980° C. | 269° C. |
| Ex. 13 | $Li_{1.01}Co_{0.945}Mg_{0.05}Al_{0.005}O_2$ | 1.01 | 1000° C. | 355° C. |
| Ex. 14 | $Li_{1.01}Co_{0.945}Mg_{0.05}Al_{0.005}O_2$ | 1.01 | 1050° C. | 355° C. |
| Ex. 15 | $Li_{1.01}Co_{0.945}Mg_{0.05}Al_{0.005}O_2$ | 1.01 | 1100° C. | 354° C. |
| Comp. Ex. 18 | $Li_{1.01}Co_{0.945}Mg_{0.05}Al_{0.005}O_2$ | 1.01 | 1120° C. | 260° C. |

EXAMPLES 16 TO 20 AND COMPARATIVE EXAMPLE 19

Next, a more detailed study was conducted on an Li content (z value) in an active material.

Specifically, a positive electrode active material having the composition shown in Table 7 was obtained in the same manner as in Example 1 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 7.

As apparent from Table 7, when z was 0.99, the active material had low stability during overcharging, and further, the capacity thereof decreased. When z was 1.04, on the other hand, the active material had excellent stability during overcharging, but had strong alkalinity, and it was thereby difficult to produce a stable electrode plate.

TABLE 7

| | Composition | z | Baking Temp. | GC/MS Max. |
|---|---|---|---|---|
| Ex. 16 | $Li_{1.04}Co_{0.945}Mg_{0.05}Al_{0.005}O_2$ | 1.04 | 1050° C. | 357° C. |
| Ex. 17 | $Li_{1.03}Co_{0.945}Mg_{0.05}Al_{0.005}O_2$ | 1.03 | 1050° C. | 356° C. |
| Ex. 18 | $Li_{1.01}Co_{0.945}Mg_{0.05}Al_{0.005}O_2$ | 1.01 | 1050° C. | 355° C. |
| Ex. 19 | $Li_{1.005}Co_{0.945}Mg_{0.05}Al_{0.005}O_2$ | 1.005 | 1050° C. | 355° C. |
| Ex. 20 | $Li_{1.00}Co_{0.945}Mg_{0.05}Al_{0.005}O_2$ | 1.00 | 1050° C. | 352° C. |
| Comp. Ex. 19 | $Li_{0.99}Co_{0.945}Mg_{0.05}Al_{0.005}O_2$ | 0.99 | 1050° C. | 269° C. |

EXAMPLES 21 TO 27 AND COMPARATIVE EXAMPLE 20

Next, a more detailed study was conducted on an Mg content (x value) in an active material.

Specifically, a positive electrode active material having the composition shown in Table 8 was obtained in the same manner as in Example 1 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 8.

As clear from Table 8, the stability during overcharging deteriorated when x was below 0.005.

TABLE 8

| | Composition | x | z | Baking Temp. | GC/MS Max. |
|---|---|---|---|---|---|
| Comp. Ex. 20 | $Li_{1.01}Co_{0.991}Mg_{0.004}Al_{0.005}O_2$ | 0.004 | 1.01 | 1050° C. | 268° C. |
| Ex. 21 | $Li_{1.01}Co_{0.99}Mg_{0.005}Al_{0.005}O_2$ | 0.005 | 1.01 | 1050° C. | 340° C. |
| Ex. 22 | $Li_{1.01}Co_{0.985}Mg_{0.01}Al_{0.005}O_2$ | 0.01 | 1.01 | 1050° C. | 348° C. |
| Ex. 23 | $Li_{1.01}Co_{0.975}Mg_{0.02}Al_{0.005}O_2$ | 0.02 | 1.01 | 1050° C. | 350° C. |
| Ex. 24 | $Li_{1.01}Co_{0.965}Mg_{0.03}Al_{0.005}O_2$ | 0.03 | 1.01 | 1050° C. | 355° C. |
| Ex. 25 | $Li_{1.01}Co_{0.945}Mg_{0.05}Al_{0.005}O_2$ | 0.05 | 1.01 | 1050° C. | 355° C. |
| Ex. 26 | $Li_{1.01}Co_{0.915}Mg_{0.08}Al_{0.005}O_2$ | 0.08 | 1.01 | 1050° C. | 357° C. |
| Ex. 27 | $Li_{1.01}Co_{0.895}Mg_{0.1}Al_{0.005}O_2$ | 0.1 | 1.01 | 1050° C. | 360° C. |

EXAMPLES 28 TO 32 AND COMPARATIVE EXAMPLE 21

Next, a more detailed study was conducted on an Al content (y value) in an active material when Al was used as the element M.

Specifically, a positive electrode active material having the composition shown in Table 9 was obtained in the same manner as in Example 1 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 9.

TABLE 9

|  | Composition | y | z | Baking Temp. | GC/MS Max. |
|---|---|---|---|---|---|
| Comp. Ex. 21 | $Li_{1.01}Co_{0.9492}Mg_{0.05}Al_{0.0008}O_2$ | 0.0008 | 1.01 | 1050° C. | 281° C. |
| Ex. 28 | $Li_{1.01}Co_{0.949}Mg_{0.05}Al_{0.001}O_2$ | 0.001 | 1.01 | 1050° C. | 350° C. |
| Ex. 29 | $Li_{1.01}Co_{0.945}Mg_{0.05}Al_{0.005}O_2$ | 0.005 | 1.01 | 1050° C. | 355° C. |
| Ex. 30 | $Li_{1.01}Co_{0.94}Mg_{0.05}Al_{0.01}O_2$ | 0.01 | 1.01 | 1050° C. | 355° C. |
| Ex. 31 | $Li_{1.01}Co_{0.93}Mg_{0.05}Al_{0.03}O_2$ | 0.03 | 1.01 | 1050° C. | 358° C. |
| Ex. 32 | $Li_{1.01}Co_{0.9}Mg_{0.05}Al_{0.05}O_2$ | 0.05 | 1.01 | 1050° C. | 355° C. |

EXAMPLES 33 TO 37 AND COMPARATIVE EXAMPLE 22

Next, a more detailed study was conducted on a Ti content (y value) in an active material when Ti was used as the element M.

Specifically, a positive electrode active material having the composition shown in Table 10 was obtained in the same manner as in Example 2 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 10.

TABLE 10

|  | Composition | y | z | Baking Temp. | GC/MS Max. |
|---|---|---|---|---|---|
| Comp. Ex. 22 | $Li_{1.01}Co_{0.9492}Mg_{0.05}Ti_{0.0008}O_2$ | 0.0008 | 1.01 | 1050° C. | 275° C. |
| Ex. 33 | $Li_{1.01}Co_{0.949}Mg_{0.05}Ti_{0.001}O_2$ | 0.001 | 1.01 | 1050° C. | 348° C. |
| Ex. 34 | $Li_{1.01}Co_{0.945}Mg_{0.05}Ti_{0.005}O_2$ | 0.005 | 1.01 | 1050° C. | 352° C. |
| Ex. 35 | $Li_{1.01}Co_{0.94}Mg_{0.05}Ti_{0.01}O_2$ | 0.01 | 1.01 | 1050° C. | 352° C. |
| Ex. 36 | $Li_{1.01}Co_{0.93}Mg_{0.05}Ti_{0.03}O_2$ | 0.03 | 1.01 | 1050° C. | 352° C. |
| Ex. 37 | $Li_{1.01}Co_{0.9}Mg_{0.05}Ti_{0.05}O_2$ | 0.05 | 1.01 | 1050° C. | 355° C. |

EXAMPLES 38 TO 42 AND COMPARATIVE EXAMPLE 23

Next, a more detailed study was conducted on an Sr content (y value) in an active material when Sr was used as the element M.

Specifically, a positive electrode active material having the composition shown in Table 11 was obtained in the same manner as in Example 3 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 11.

TABLE 11

|  | Composition | y | z | Baking Temp. | GC/MS Max. |
|---|---|---|---|---|---|
| Comp. Ex. 23 | $Li_{1.01}Co_{0.9492}Mg_{0.05}Sr_{0.0008}O_2$ | 0.0008 | 1.01 | 1050° C. | 277° C. |
| Ex. 38 | $Li_{1.01}Co_{0.949}Mg_{0.05}Sr_{0.001}O_2$ | 0.001 | 1.01 | 1050° C. | 351° C. |
| Ex. 39 | $Li_{1.01}Co_{0.945}Mg_{0.05}Sr_{0.005}O_2$ | 0.005 | 1.01 | 1050° C. | 356° C. |
| Ex. 40 | $Li_{1.01}Co_{0.94}Mg_{0.05}Sr_{0.01}O_2$ | 0.01 | 1.01 | 1050° C. | 358° C. |
| Ex. 41 | $Li_{1.01}Co_{0.93}Mg_{0.05}Sr_{0.03}O_2$ | 0.03 | 1.01 | 1050° C. | 358° C. |
| Ex. 42 | $Li_{1.01}Co_{0.9}Mg_{0.05}Sr_{0.05}O_2$ | 0.05 | 1.01 | 1050° C. | 358° C. |

EXAMPLES 43 TO 47 AND COMPARATIVE EXAMPLE 24

Next, a more detailed study was conducted on an Mn content (y value) in an active material when Mn was used as the element M.

Specifically, a positive electrode active material having the composition shown in Table 12 was obtained in the same manner as in Example 4 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 12.

TABLE 12

|  | Composition | y | z | Baking Temp. | GC/MS Max. |
|---|---|---|---|---|---|
| Comp. Ex. 24 | $Li_{1.01}Co_{0.9492}Mg_{0.05}Mn_{0.0008}O_2$ | 0.0008 | 1.01 | 1050° C. | 270° C. |
| Ex. 43 | $Li_{1.01}Co_{0.949}Mg_{0.05}Mn_{0.001}O_2$ | 0.001 | 1.01 | 1050° C. | 347° C. |
| Ex. 44 | $Li_{1.01}Co_{0.945}Mg_{0.05}Mn_{0.005}O_2$ | 0.005 | 1.01 | 1050° C. | 350° C. |
| Ex. 45 | $Li_{1.01}Co_{0.94}Mg_{0.05}Mn_{0.01}O_2$ | 0.01 | 1.01 | 1050° C. | 350° C. |
| Ex. 46 | $Li_{1.01}Co_{0.93}Mg_{0.05}Mn_{0.03}O_2$ | 0.03 | 1.01 | 1050° C. | 351° C. |
| Ex. 47 | $Li_{1.01}Co_{0.9}Mg_{0.05}Mn_{0.05}O_2$ | 0.05 | 1.01 | 1050° C. | 351° C. |

EXAMPLES 48 TO 52 AND COMPARATIVE EXAMPLE 25

Next, a more detailed study was conducted on an Ni content (y value) in an active material when Ni was used as the element M.

Specifically, a positive electrode active material having the composition shown in Table 13 was obtained in the same manner as in Example 5 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 13.

TABLE 13

|  | Composition | y | z | Baking Temp. | GC/MS Max. |
|---|---|---|---|---|---|
| Comp. Ex. 25 | $Li_{1.01}Co_{0.9492}Mg_{0.05}Ni_{0.0008}O_2$ | 0.0008 | 1.01 | 1050° C. | 271° C. |
| Ex. 48 | $Li_{1.01}Co_{0.949}Mg_{0.05}Ni_{0.001}O_2$ | 0.001 | 1.01 | 1050° C. | 347° C. |
| Ex. 49 | $Li_{1.01}Co_{0.945}Mg_{0.05}Ni_{0.005}O_2$ | 0.005 | 1.01 | 1050° C. | 350° C. |
| Ex. 50 | $Li_{1.01}Co_{0.94}Mg_{0.05}Ni_{0.01}O_2$ | 0.01 | 1.01 | 1050° C. | 351° C. |
| Ex. 51 | $Li_{1.01}Co_{0.93}Mg_{0.05}Ni_{0.03}O_2$ | 0.03 | 1.01 | 1050° C. | 350° C. |
| Ex. 52 | $Li_{1.01}Co_{0.9}Mg_{0.05}Ni_{0.05}O_2$ | 0.05 | 1.01 | 1050° C. | 351° C. |

EXAMPLES 53 TO 57 AND COMPARATIVE EXAMPLE 26

Next, a more detailed study was conducted on a Ca content (y value) in an active material when Ca was used as the element M.

Specifically, a positive electrode active material having the composition shown in Table 14 was obtained in the same manner as in Example 6 except that the composition of the raw material mixture was varied. A prismatic lithium-ion secondary battery was assembled in the same manner as in Example 1 except for the use of the aforesaid active material, and the stability of the battery when overcharged was evaluated by the GC/MS measurement in the same manner as in Example 1. The results are shown in Table 14.

It is to be noted that when the charge/discharge cycles of the same battery as the battery obtained in each of Examples were repeated in the voltage range of 3 V to 4.2 V, deterioration in cycle characteristic was observed in the range of y<0.001. In the range of 0.03<y, on the other hand, the cycle characteristic was improved, but the capacity decreased as the heteroelement increased.

It is of importance, for obtaining the element-M-producing effect of improving a cycle characteristic, to make active materials uniformly react. Since the positive electrode active material of the present invention is thermally stable, as having the maximum value of an oxygen generation peak in a high temperature region of 330° C. or higher, a solid phase reaction is sufficiently promoted in synthesis of the active material, and the uniformity of the active materials can thus be considered as very high. Hence it can be thought that the cycle characteristic significantly improves in the range of $0.001 \leq y$.

As apparent from Tables 1 to 14, the maximum value of the oxygen generation peak of the oxygen generation spectrum in each of Examples increased dramatically, as compared to that in each of Comparative Examples. According to the present invention, therefore, it is possible to obtain a non-aqueous electrolyte secondary battery capable of maintaining high thermal resistance even when overcharged. Furthermore, since the active material of the present invention uniformly contains the element M, a cycle characteristic can be significantly improved.

Although the present invention has been described in terms of the presently preferred embodiments, it is to be

TABLE 14

|  | Composition | y | z | Baking Temp. | GC/MS Max. |
|---|---|---|---|---|---|
| Comp. Ex. 26 | $Li_{1.01}Co_{0.9492}Mg_{0.05}Ca_{0.0008}O_2$ | 0.0008 | 1.01 | 1050° C. | 270° C. |
| Ex. 53 | $Li_{1.01}Co_{0.949}Mg_{0.05}Ca_{0.001}O_2$ | 0.001 | 1.01 | 1050° C. | 350° C. |
| Ex. 54 | $Li_{1.01}Co_{0.945}Mg_{0.05}Ca_{0.005}O_2$ | 0.005 | 1.01 | 1050° C. | 357° C. |
| Ex. 55 | $Li_{1.01}Co_{0.94}Mg_{0.05}Ca_{0.01}O_2$ | 0.01 | 1.01 | 1050° C. | 357° C. |
| Ex. 56 | $Li_{1.01}Co_{0.93}Mg_{0.05}Ca_{0.03}O_2$ | 0.03 | 1.01 | 1050° C. | 357° C. |
| Ex. 57 | $Li_{1.01}Co_{0.9}Mg_{0.05}Ca_{0.05}O_2$ | 0.05 | 1.01 | 1050° C. | 360° C. | understood that such disclosure is not to be interpreted as limiting. Various alternations and modifications will no doubt become apparent to those skilled in the art to which the present invention pertains, after having read the above disclosure. Accordingly, it is intended that the appended claims be interpreted as covering all alternations and modifications as fall within the true spirit and scope of the invention.

The invention claimed is:

1. A non-aqueous electrolyte secondary battery, comprising:
    a positive electrode; a negative electrode;
    a separator interposed between said positive electrode and said negative electrode; and
    a non-aqueous electrolyte, wherein said positive electrode comprises a lithium-containing composite oxide, said composite oxide is represented by the general formula: $Li_zCo_{1-x-y}Mg_xM_yO_2$, the element M included in said general formula is at least one selected from the group consisting of Al, Ti, Sr, Mn, Ni and Ca, the values x, y and z contained in said general formula satisfy: (i) $0 > z \leq 1.03$; (ii) $0.005 \leq x \leq 0.1$; and (iii) $0.001 \leq y \leq 0.03$, said composite oxide has a crystal structure attributed to a hexagonal system in an overcharged state having a potential over 4.25 V relative to metallic Li, and a maximum value of an oxygen generation peak in a chromatograph mass spectrometry measurement of said composite oxide in said overcharged state is in the range of 330 to 370° C.,
    wherein an end-of-charge voltage normal operating state is set to 4.25 V or higher.

2. The non-aqueous electrolyte secondary battery according to claim 1, wherein said end-of-charge voltage normal operating state is set to 4.3 V or higher.

3. The non-aqueous electrolyte secondary battery according to claim 1, wherein said end-of-charge voltage normal operating state is set to 4.35 V or higher.

4. The non-aqueous electrolyte secondary battery according to claim 1, wherein said end-of-charge voltage normal operating state is set to 4.4 V or higher.

* * * * *